(12) United States Patent
Maone

(10) Patent No.: US 7,973,528 B2
(45) Date of Patent: Jul. 5, 2011

(54) SENSOR DEVICE

(75) Inventor: Francesco Alex Maone, Zurich (CH)

(73) Assignee: Infineon Technologies AG, Neubiberg (DE)

( * ) Notice: Subject to any disclaimer, the term of this patent is extended or adjusted under 35 U.S.C. 154(b) by 344 days.

(21) Appl. No.: 12/131,426

(22) Filed: Jun. 2, 2008

(65) Prior Publication Data

US 2008/0297147 A1    Dec. 4, 2008

(30) Foreign Application Priority Data

May 31, 2007    (DE) .......................... 10 2007 025 322

(51) Int. Cl.
*G01B 7/30*    (2006.01)
(52) U.S. Cl. .................................................. 324/207.25
(58) Field of Classification Search .............. 324/207.25
See application file for complete search history.

(56) References Cited

FOREIGN PATENT DOCUMENTS

| DE | 103 38 120 A1 | 3/2005 |
|---|---|---|
| EP | 1 750 100 A1 | 2/2007 |
| EP | 1 780 515 A1 | 5/2007 |

*Primary Examiner* — Reena Aurora
(74) *Attorney, Agent, or Firm* — Dickstein Shapiro LLP

(57) ABSTRACT

A sensor device for detecting a relative movement including a transmitter unit configured to generate a field. The transmitter unit includes first transmitter elements and second transmitter elements, wherein the first transmitter elements and the second transmitter elements, configured to generate a spatially varying field, are arranged alternately one behind another along a line at predetermined positions, and at a reference position, which corresponds to at least one of the predetermined positions of a first or second transmitter element along the line, at least one value of the field is altered by a positive factor with respect to a corresponding other position of a first or second transmitter element. Furthermore, a pick-up unit is configured to generate an alternating output signal depending on the field generated by the first and second transmitter elements, wherein the transmitter unit and the pick-up unit can be moved relative to one another.

17 Claims, 9 Drawing Sheets

SENSOR DEVICE

CROSS-REFERENCE TO RELATED APPLICATION

This application claims priority to German Patent Application Serial No. 10 2007 025 322.4, which was filed May 31, 2007, and is incorporated herein by reference in its entirety.

TECHNICAL FIELD

The present invention relates generally to sensor devices for detecting relative movements.

In particular, the present invention relates to magnetized rotors in conjunction with magnetic field sensors such as, for example, Hall sensors, GMR (Giant Magnetic Resistive) sensors, etc. Sensors of this type are widespread in the detection of linear and/or rotational movements owing to many advantages, such as, for example, insensitivity to interference and possibility of contactless detection. In the automotive industry, in particular, sensors of this type are in use for detecting the engine rotational speed and the engine rotation direction. Measurement variables of this type generally have to be detected with a high accuracy and reliability.

BACKGROUND

Sensor devices based on magnetic transmitters and associated pick-ups which are used for detecting rotational movements, usually have a reference detection region, which can be used to generate a reference signal that provides a reference position marking during the detection of the rotational movement.

A reference detection region 213 of this type is illustrated in FIG. 5, in which an excerpt from a rotor provided from alternating first and second transmitter elements 101, 102 is shown. Transmitter elements of this type can be provided for example from permanent magnets which are arranged alternately with regard to their north-south direction, which is oriented parallel to the axis of rotation of the rotor. Thus, in FIG. 5, for example, the first transmitter elements 101 are formed as an N pole (north pole), while the second transmitter elements 102 are formed as an S pole (south pole).

The conventional arrangement shown in FIG. 5 has a reference detection region 213, which is characterized by the fact that three identical transmitter elements 102 arranged one behind another are formed. The introduction of such an asymmetry into the circumferential arrangement of the magnetic poles has significant effects on the magnetic flux to be detected by a pick-up unit (not shown). The magnetic fluxes detected by means of the conventional rotor and the reference detection region 213 described are illustrated in FIGS. 6(a) and (b) and FIGS. 7(a) and (b). In this case, the individual curve profiles correspond to specific magnetic fluxes calculated or simulated for different air gaps. Consequently, a first air gap 201 is larger than a second air gap 202, which is in turn larger than a third air gap 203, which is in turn larger than a fourth air gap 204. In this case, the size of the air gap denotes a distance between the pick-up unit and the first and second transmitter elements 101 and 102 moving past the latter. In the example shown in FIGS. 6 and 7, the first air gap 201 has a value of 1 mm, the second air gap 202 has a value of 2 mm, the third air gap 203 has a value of 3 mm, and the fourth air gap 204 has a value of 4 mm.

FIGS. 6(a), (b) to 7(a), (b) show magnetic flux profiles as a function of a detection position 210, wherein the detection position has the reference detection region 213 in the middle of the horizontal axis (x-axis). Consequently, it can be discerned from FIGS. 6 and 7 that, in the middle of the x-axis, an alteration of the magnetic flux occurs, in such a way that this alteration can be used as the reference position. To the left and right of this altered region of the magnetic flux, the magnetic flux has a regular region given by the alternating arrangement of the first and second transmitter elements on the rotor.

The first and second transmitter elements 101, 102 are illustrated for reference in the lower part of FIG. 6(a). The alteration of the magnetic flux 209 in the reference detection region 213 should be pointed out, in particular, said region comprising second transmitter elements 102r arranged one behind another, not alternately, in the conventional example shown.

FIG. 6(b) shows the magnetic flux profile illustrated in FIG. 6(a) in a differential form, that is to say that the profile shown in FIG. 6(b) corresponds to the differentiated magnetic flux profile 209. Consequently, FIG. 6(a) illustrates a tangential magnetic flux 209, while FIG. 6(b) illustrates a differential tangential magnetic flux profile 209'.

Furthermore, FIG. 7(a) shows a normalized tangential magnetic flux 214, wherein a normalization is normalized with regard to each individual profile corresponding to the first to fourth air gaps 201-204.

FIG. 7(b) illustrates the differentiated normalized tangential magnetic flux profile of FIG. 7(a), that is to say a differential normalized tangential magnetic flux 214'.

Since the profile illustrated in FIG. 7(b) is always detected by means of the pick-up unit, a problem in the generation of a reference position signal by means of the conventional rotor arrangement shown in FIG. 5 is clear. The possibility of detecting the reference position varies greatly with the air gap, as can be discerned from the curve profiles for the first to fourth air gaps 201-204. Only the regions of the third and fourth air gaps 203, 204 have an approximately matching profile in the reference detection region, but not in the other regions.

Consequently, it is a significant disadvantage of the conventional magnetic sensor device described that the near field in the vicinity of the reference point is highly influenced on account of the irregular arrangement of the first and second magnetization elements. Furthermore, this magnetic field disadvantageously varies greatly with the distance between pick-up unit and transmitter unit, that is to say significantly with the size of the air gap 201, 202, 203 and 204.

Both factors disadvantageously impair the operating behavior of conventional magnetic sensor devices, wherein manufacturing tolerances such as, for example, the design of the air gap or the distance between transmitter unit and pick-up unit and the like have a major disadvantageous influence.

SUMMARY OF THE INVENTION

Accordingly, the present invention provides an improved magnetic sensor device in which reference position detection with high accuracy and reliability is made possible.

BRIEF DESCRIPTION OF THE DRAWINGS

Exemplary embodiments of the invention are illustrated in the drawings and explained in more detail in the description below.

In the drawings.

In the figures, identical reference symbols designate identical or functionally identical components or steps.

DESCRIPTION OF THE INVENTION

Figure 1:
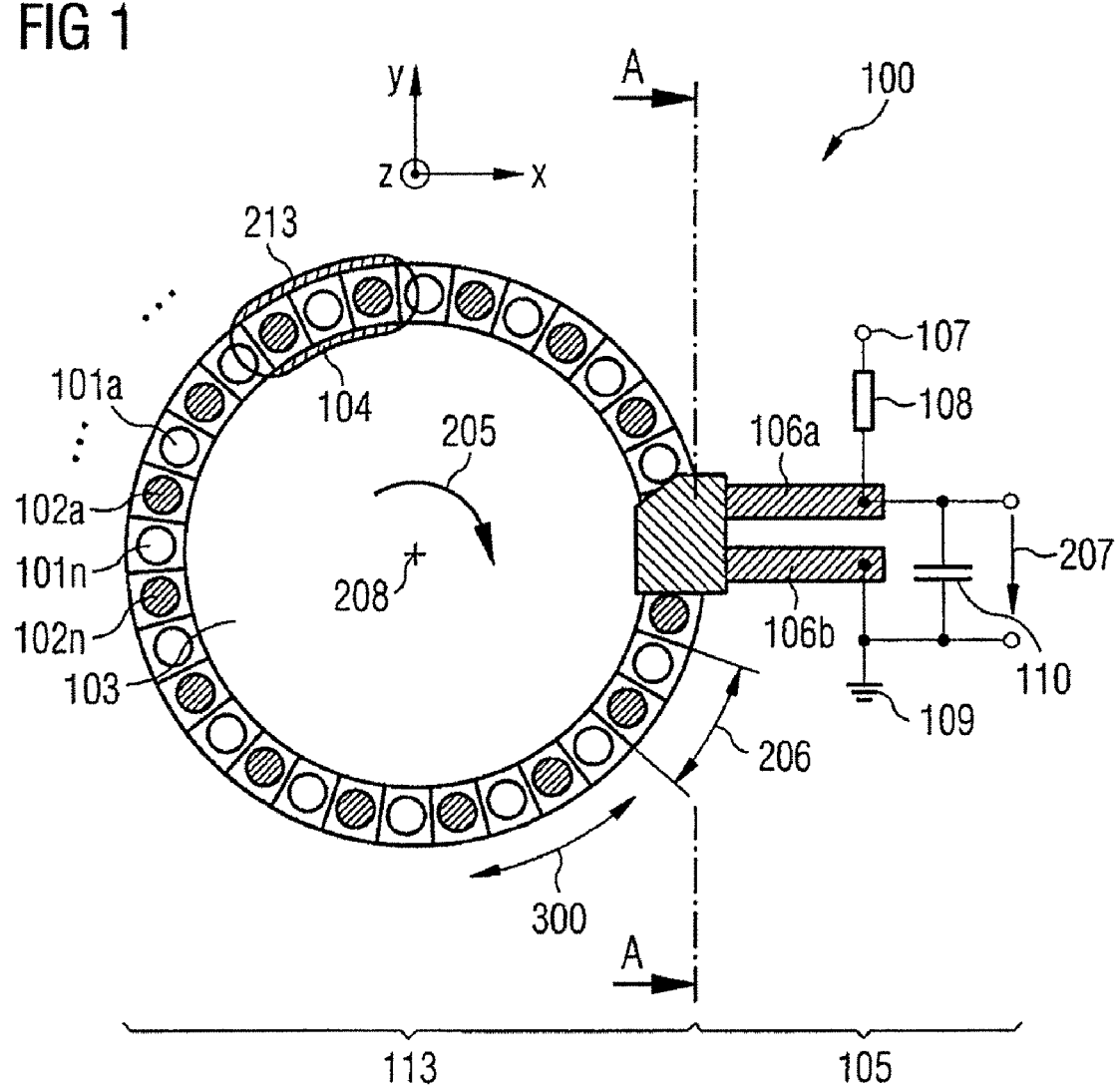
FIG. 1 shows a magnetic sensor device comprising a transmitter unit formed as a rotor and a pick-up unit for illustrating the principles of the present invention.

The invention involves providing a reference position along a transmitter unit by virtue of the fact that the field generated by first and second transmitter elements arranged alternately in the reference detection region is not disturbed but rather is only altered slightly in terms of its value, preferably attenuated. As will be explained below, this has very advantageous effects in particular on the tangential field profile picked up by the pick-up unit, and also on the differential tangential field profile, the normalized tangential field profile and the differential normalized tangential field profile.

An advantage of the arrangement according to the invention is that the disturbance of the field is kept small. In particular, the disturbance of the field can be kept small on both sides of the reference point. Furthermore, it is possible to provide a high accuracy of a reference position detection with little dependence on the distance between transmitter unit and pick-up unit. Consequently, a large air gap variation is advantageously permitted without the accuracy of a reference position detection thereby being reduced.

The sensor device according to the invention for detecting a relative movement comprises:

a transmitter unit configured to generate a field comprising:
first transmitter elements; and
second transmitter elements,
wherein the first transmitter elements and the second transmitter elements, configured to generate a spatially varying field, are arranged alternately one behind another along a line at predetermined positions, and
wherein at a reference position, which corresponds to at least one of the predetermined positions of a first or second transmitter element along the line, at least one value of the field is altered by a positive factor with respect to a corresponding other position of a first or second transmitter element; and
a pick-up unit configured to generate an alternating output signal depending on the field generated by the first and second transmitter elements, wherein the transmitter unit and the pick-up unit can be moved relative to one another.

Furthermore, the method according to the invention for detecting a relative movement comprises:

generating a field by a transmitter unit comprising first transmitter elements and second transmitter elements arranged alternately one behind another along a line at predetermined positions, wherein the generating comprises:
generating a spatially varying field, by the first transmitter elements and the second transmitter elements; and
altering, at a reference position which corresponds to at least one of the predetermined positions of a first or second transmitter element along the line, at least one value of the field by a positive factor with respect to a corresponding other position of a first or second transmitter element; and
generating an alternating output signal depending on the field generated by the first and second transmitter elements, by a pick-up unit, wherein the transmitter unit and the pick-up unit are moved relative to one another.

In this case, the value of the positive factor preferably lies within the range of between 0.05 and 0.3.

In accordance with one preferred development of the present invention, the first transmitter elements and the second transmitter elements are arranged alternately one behind another in a straight line, wherein the relative movement detected is a transverse movement.

In accordance with a further preferred development of the present invention, the first transmitter elements and the second transmitter elements are arranged alternately one behind another on a circle circumference wherein the relative movement detected is a rotational movement in a predetermined rotation direction.

In accordance with yet another preferred development of the present invention, the field is a magnetic field. It is furthermore preferred if an attenuation unit, in particular a magnetic attenuation unit, is provided. In this case, the magnetic attenuation unit is preferably formed from a ferromagnetic material. Preferably, the magnetic attenuation unit is formed as a coating having a layer thickness within a range of 1 μm to 100 μm.

It is advantageous that the transmitter unit is formed as a rotor, wherein a rotational movement in a predetermined rotation direction can be detected.

In accordance with yet another preferred development of the present invention, the first and second transmitter elements arranged alternately one behind another in a line have a predetermined pitch distance.

Preferably, the predetermined pitch distance corresponds to a sum of widths of one of the first and one of the second transmitter elements in the direction of the relative movement.

In accordance with a further preferred development of the present invention, the magnetic attenuation unit, by means of which at least one of the alternating first and second transmitter elements is shielded, extends over 1.5 times the pitch distance.

An arrangement of this type makes it possible to achieve a transmitter unit for a magnetic sensor device and an associated magnetic sensor device are provided in which a reference position detection is made possible in a precise manner.

The invention is explained below on the basis of examples in which the field is formed as a magnetic field. However, the present invention can be carried out using other fields, for example, electric or electromagnetic fields (light).

FIG. 1 shows a schematic view of a magnetic sensor device 100, constructed from two blocks, that is to say from a transmitter unit 113 and a pick-up unit 105. The transmitter unit 113 has first transmitter elements 101a-101n and second transmitter elements 102a-102n. In this case, the first transmitter elements 101a-101n and the second transmitter elements 102a-102n, for generating a magnetic flux 200 (see FIG. 2) are arranged alternately one behind another in a line. In the exemplary embodiment shown in FIG. 1, the first transmitter elements 101a-101n and the second transmitter elements 102a-102n are arranged alternately one behind another on predetermined positions on a circle circumference in such a way that a detected relative movement 300 (see FIG. 2) is a rotational movement in a predetermined rotation direction 205 about an axis 208 of rotation.

Preferably, the first and second transmitter elements 101a-101n, 102a-102n are formed as permanent magnets arranged on a so-called rotor as carrier device 103. In this case, the filled-in circles (black circles in FIG. 1) correspond, for example, to the second transmitter elements 102a-102n, which are formed as south poles (S poles), while the empty circles (first transmitter elements 101a-101n) are formed as N poles (north poles). By virtue of the alternating arrangement of the first transmitter elements 101a-101n and the second transmitter elements 102a-102n, in the case of a rotational movement in the rotation direction 205 about the axis 208 of rotation of the carrier device 103, an alternating magnetic flux 200 comprising a first magnetic flux 200a and a second magnetic flux 200b (see FIG. 2), is generated, which can be detected by the pick-up unit 105.

Figure 2:
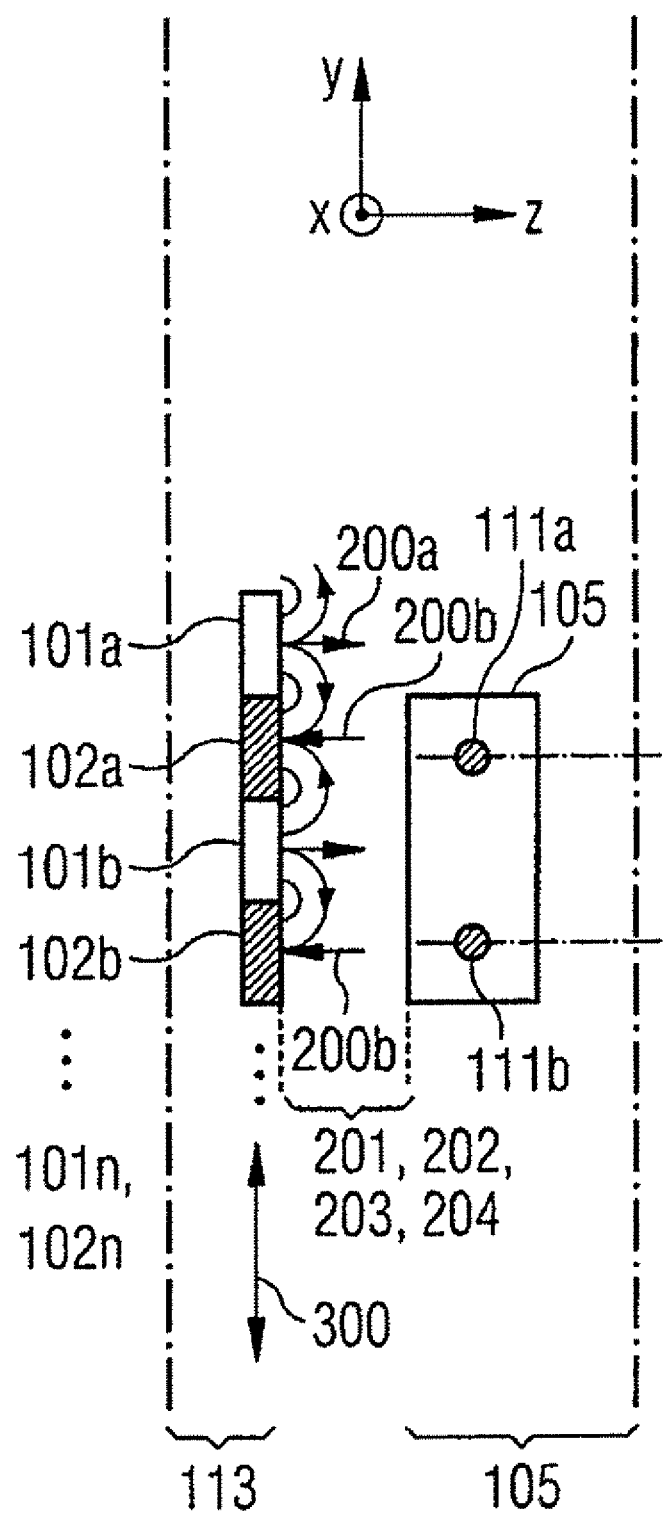
FIG. 2 shows a sectional view in the direction of the x-axis of FIG. 1, that is to say along a section A-A in FIG. 1, for illustrating the picking up of a transverse magnetic flux, generated by the transmitter unit, by means of the pick-up unit.

It should be pointed out that the first and second magnetic fluxes 200a, 200b form a total magnetic flux 200 oriented in a tangential direction. At the positions 111a, 111b which are designated as sensor positions, the alternating magnetic flux 200, 200a, 200b is detected by the pick-up unit 105, as illustrated in FIG. 2. FIG. 1 furthermore indicates a system of coordinates X, Y, Z for orientation, wherein the axis 208 of rotation of the transmitter device 113 is oriented parallel to the z-axis.

FIG. 2 is a section along a line A-A in FIG. 1, looking in an x direction along the position at which the first transmitter elements 101a-101n and the second transmitter elements 102a-102n and the pick-up unit 105 are opposite one another. The reference symbols 201, 202, 203 and 204 designate a first air gap, a second air gap, a third air gap and a fourth air gap, respectively, which are formed in each case between the first and second transmitter elements 101a-101n, 102a-102n and the pick-up unit 105. The effects of the different air gaps 201-204 are discussed below with reference to FIGS. 3, 9(a), 9(b), 10(a) and 10(b).

The pick-up unit 105 shown in FIG. 1 has first and second output terminals 106a, 106b at which a sensor signal can be tapped off. For this purpose, the output terminal 106a is connected to a voltage supply terminal 107 via a series resistor 108, while the second output terminal 106b is connected to ground 109. A smoothing capacitor 110 is connected between the first and second output terminals 106a, 106b for smoothing purposes. Consequently, a smoothed output signal 207 can be tapped off between the first output terminal 106a and ground 109 and processed further.

It should be pointed out that this is only an example of the outputting of the sensor signal. Other interfaces may require other connections.

Figure 9A:
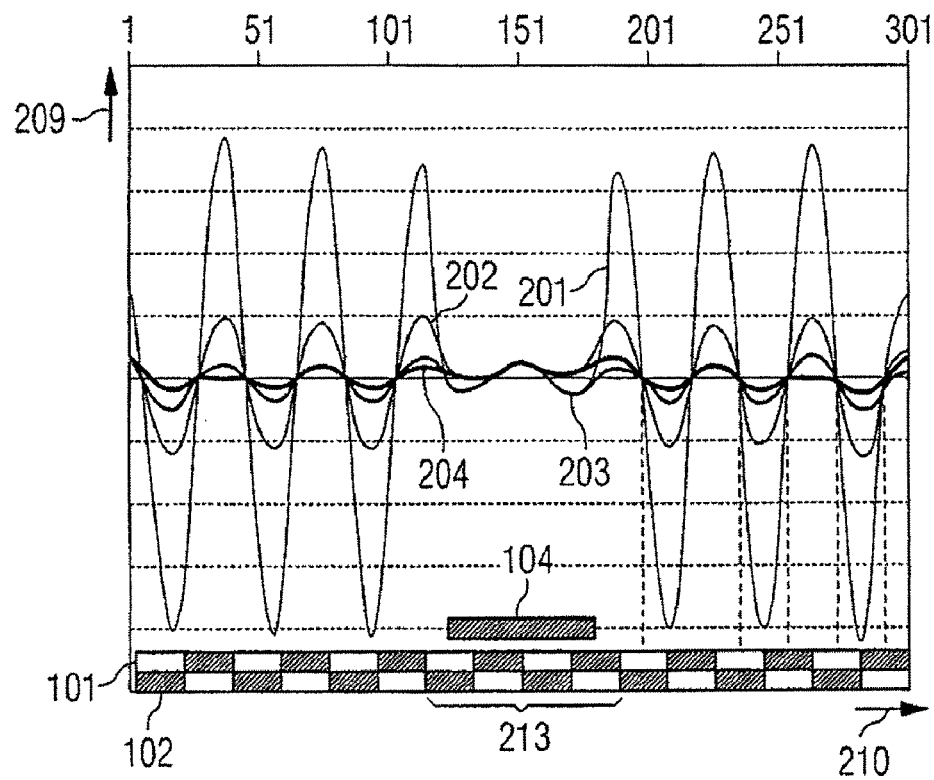
FIG. 9(a) shows a tangential magnetic flux as a function of a detection position for a magnetic sensor device in accordance with a preferred exemplary embodiment of the present invention.
Figure 9B:
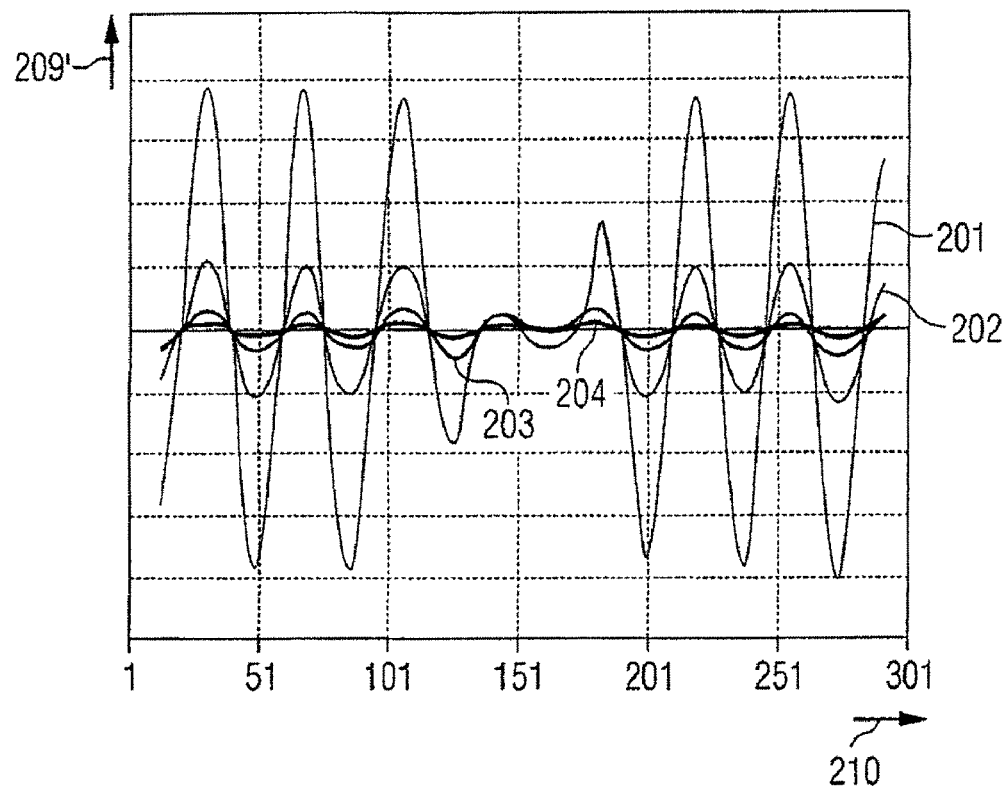
FIG. 9(b) shows a differential tangential magnetic flux profile obtained by forming the differential of the magnetic flux shown in FIG. 9(a)
Figure 10A:
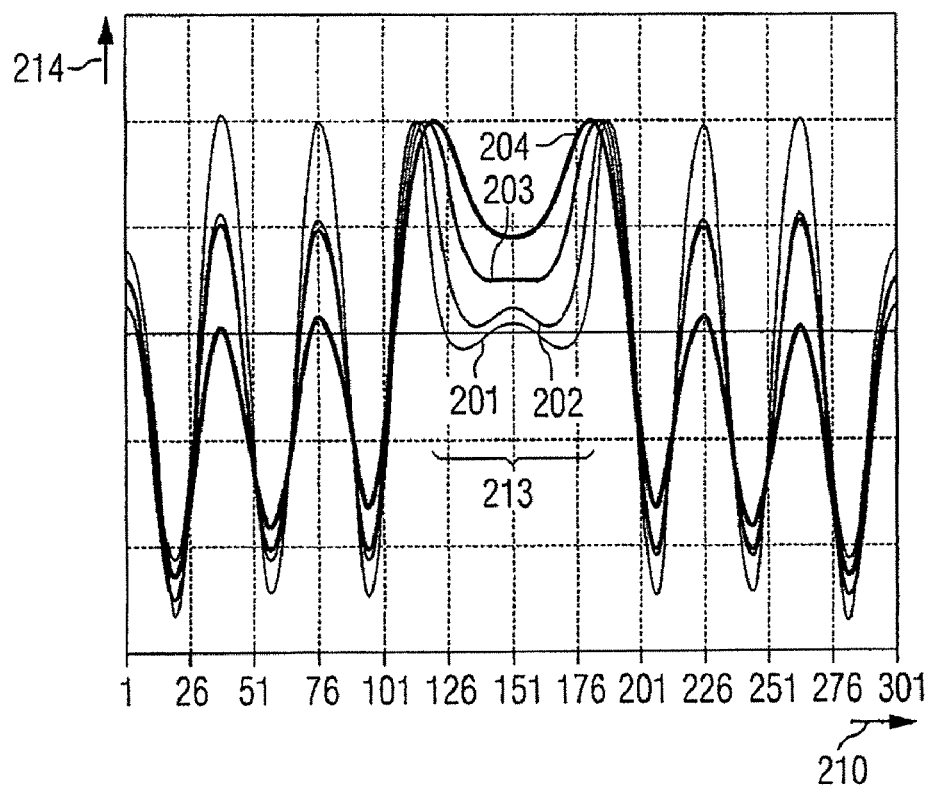
FIG. 10(a) shows a normalized tangential magnetic flux obtained by normalization with regard to each curve of the tangential magnetic flux shown in FIG. 9(a)
Figure 10B:
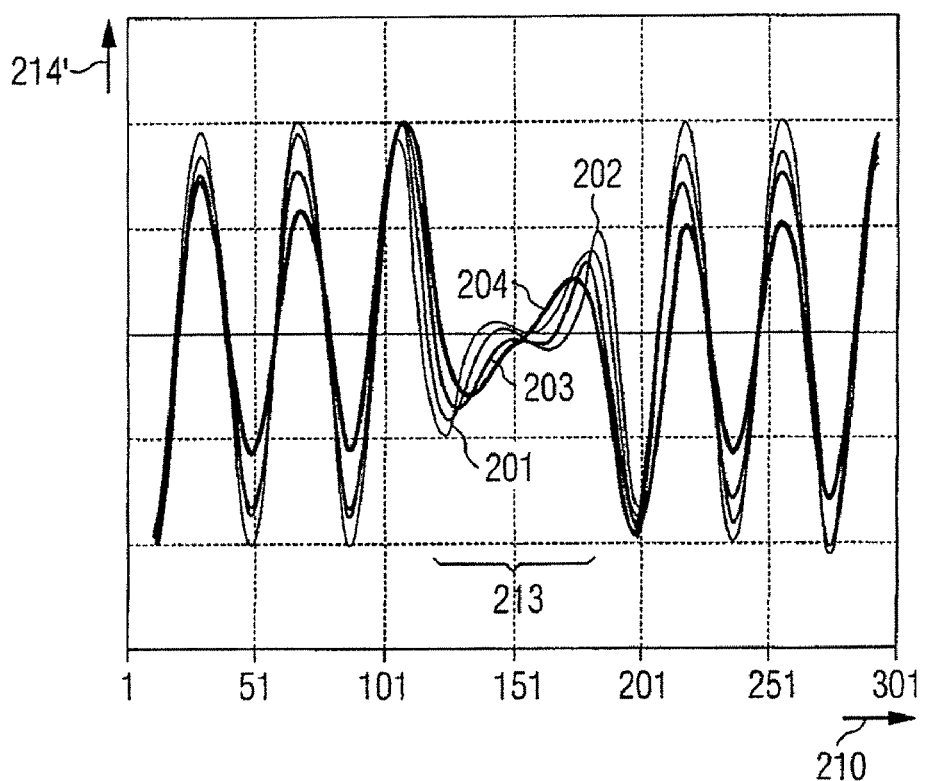
FIG. 10(b) shows a differential normalized tangential magnetic flux profile obtained by forming the differential of the normalized tangential magnetic flux profile shown in FIG. 10(a).

It should be pointed out, furthermore, that the magnetic fluxes described below with reference to FIGS. 9(a), 9(b), 10(a) and 10(b) correspond to said output signal 207 in terms of their profile. The waveforms shown in FIGS. 9 and 10 are discussed in more detail below.

Furthermore, it should be pointed out that the transmitter unit 113 illustrated in FIG. 1 has a reference position or a reference detection region 213, in such a way that the magnetic field of three transmitter elements 101, 102 lying alongside one another is attenuated by a magnetic attenuation unit 104 (illustrated by dashed lines in FIG. 1). Accordingly, at this reference position, the value of the magnetic field is altered by a positive factor (<1) with respect to a corresponding other position, for example a position on the radially opposite side of the rotor.

Furthermore, with reference to the transmitter unit 113, FIG. 1 defines a pitch distance 206 corresponding to a sum of widths of one of the first 101a-101n and one of the second transmitter elements 102a-102n in the direction of the relative movement 300 (FIG. 2).

Figure 3:
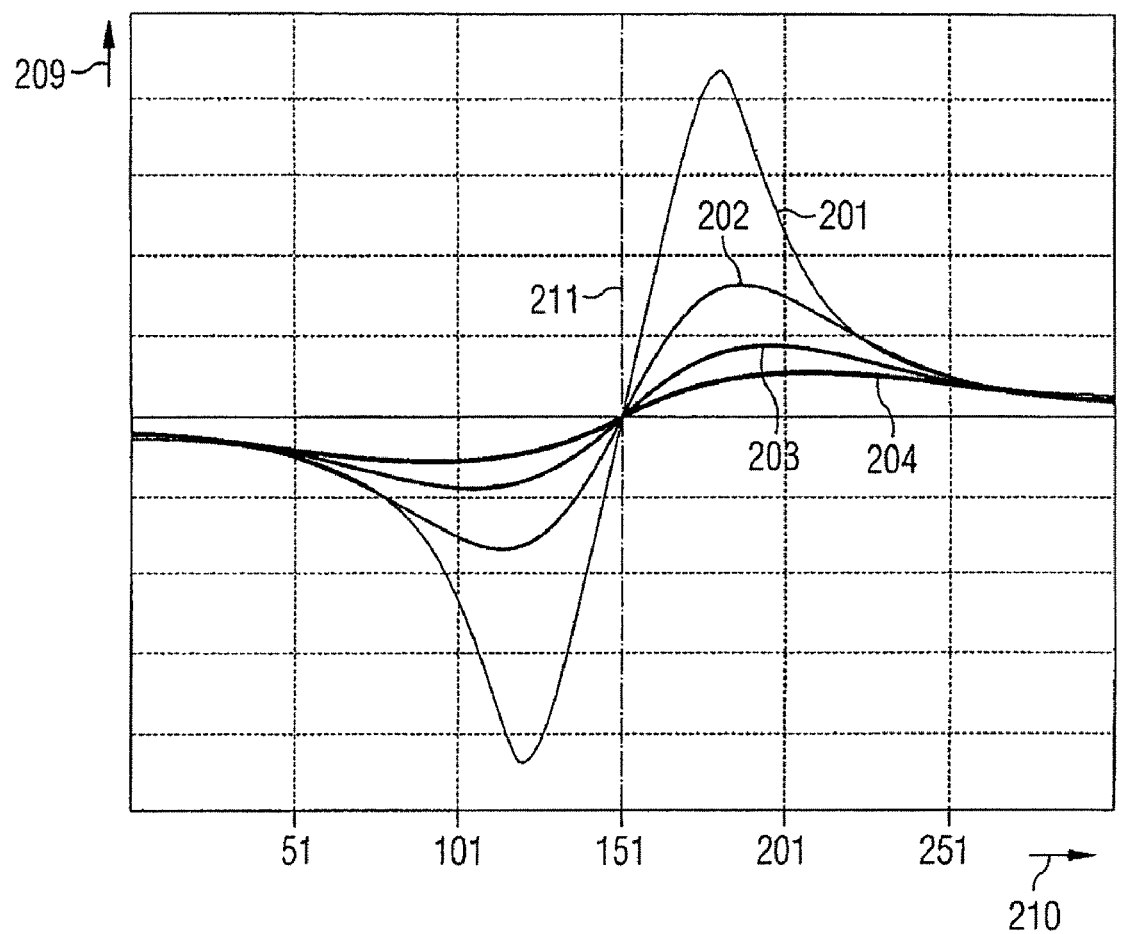
FIG. 3 shows the profile of a tangential magnetic flux as a function of the detection position with indication of a center position using the example of a magnetic dipole for different air gap widths.

FIG. 3 shows a tangential magnetic flux 209 as a function of a detection position for different air gaps 201-204. In this case, those air gaps which correspond to the curves 201-204 are of different sizes. Thus, an air gap of 1 mm corresponds to a first curve profile 201, a second air gap of 2 mm corresponds to a second curve profile 202, a third air gap of 3 mm corresponds to a third curve profile 203, and a fourth curve profile 204 corresponds to a fourth air gap of 4 mm. It should be pointed out that FIG. 3 illustrates the magnetic field profile corresponding to a single magnetization element (NS element, north-south pole). In a generic arrangement of magnetic dipoles the total flux along the tangential direction can be expressed by a following equation (1).

$$B_t(y) = \sum_{i=0}^{n} h(y - i\lambda) \quad (1)$$

In this case, the function h(y) corresponds to a function representing the tangential flux that is generated by a single dipole. Such a flux is illustrated with reference to FIG. 4 in a two-dimensional plane, wherein lines indicated by the reference symbols 212a-212n represent magnetic flux lines, while the reference symbols 112a, 112b show the magnetic dipole. In this case, as also explained with reference to FIGS. 1 and 2, the y-direction represents a tangential direction with respect to the transmitter unit 113.

It should be pointed out that the relationship in equation (1) above holds true when the individual magnetic dipoles are N-S elements. For the general case, that is to say when N-S elements and S-N elements are provided, the equation (1) is extended into equation (2), represented below.

$$B_t(y) = \sum_{i=0}^{n} a_i h(y - i\lambda) \quad (2)$$

where $$a_i = \begin{Bmatrix} 1 & \text{for } N - S \text{ elements} \\ -1 & \text{for } S - N \text{ elements} \end{Bmatrix}$$

In this case, n corresponds to the total number of elements and X corresponds to a unit spacing.

As shown in FIG. 3, the tangential magnetic flux 209 is greatly dependent on the air gap 201-204. For the design of reliable magnetic sensor devices, however, it is necessary for at least one differential normalized tangential magnetic flux to have a small dependence on the air gap, that is to say the distance between the transmitter unit 113 and the pick-up unit 105 of a magnetic sensor device 100 (see FIGS. 1 and 2), and this preferably not only at the reference point but also in the vicinity thereof.

An advantage of the method according to the invention and of the magnetic sensor device according to the invention is that the air gap can vary in large ranges without influencing the output signal 207 of the pick-up unit 105 in the vicinity of the reference point (FIG. 1).

Figure 4:
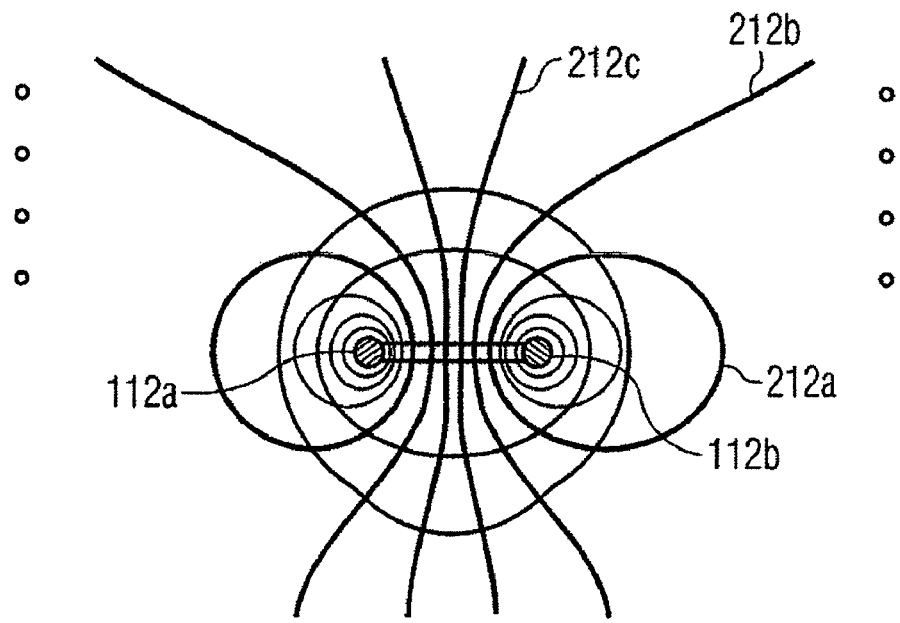
FIG. 4 shows the profile of field lines of a tangential magnetic flux, generated by a magnetic dipole, in a two-dimensional illustration.
Figure 5:
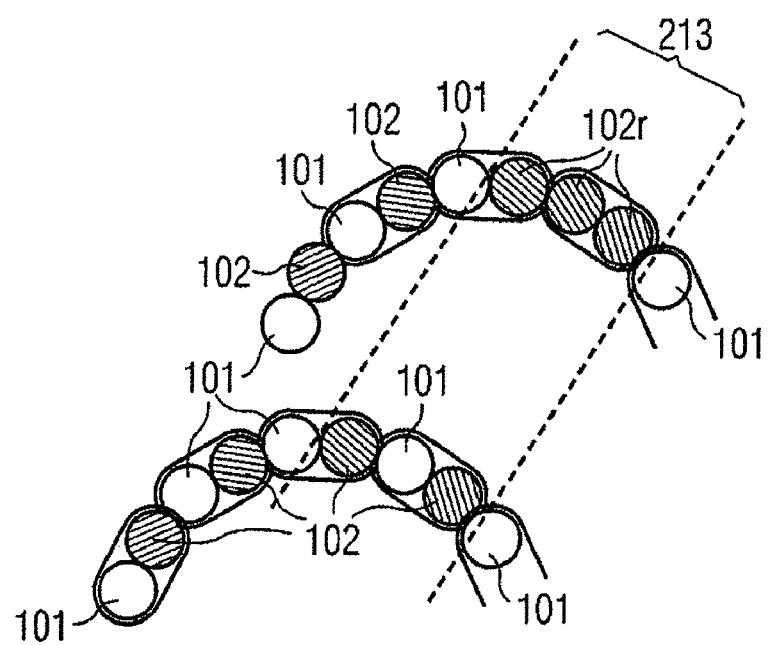
FIG. 5 shows an excerpt from a rotor with conventional reference position detection.
Figure 6A:
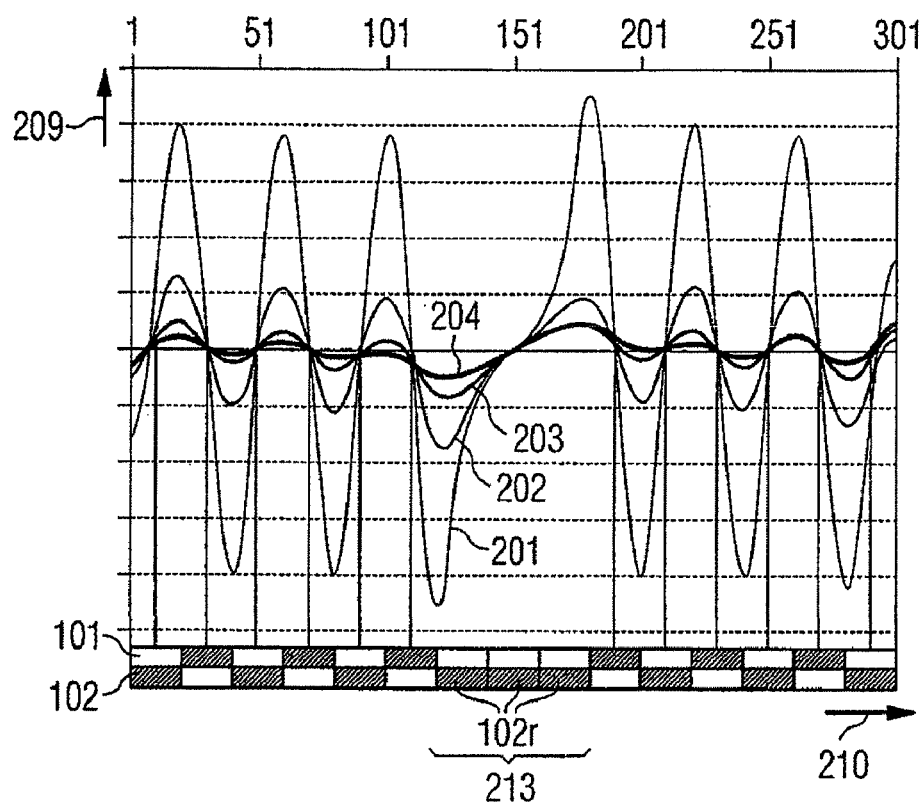
FIG. 6(a) shows the profile of a tangential magnetic flux as a function of a detection position for a magnetic sensor device having a transmitter unit with conventional reference position detection.
Figure 6B:
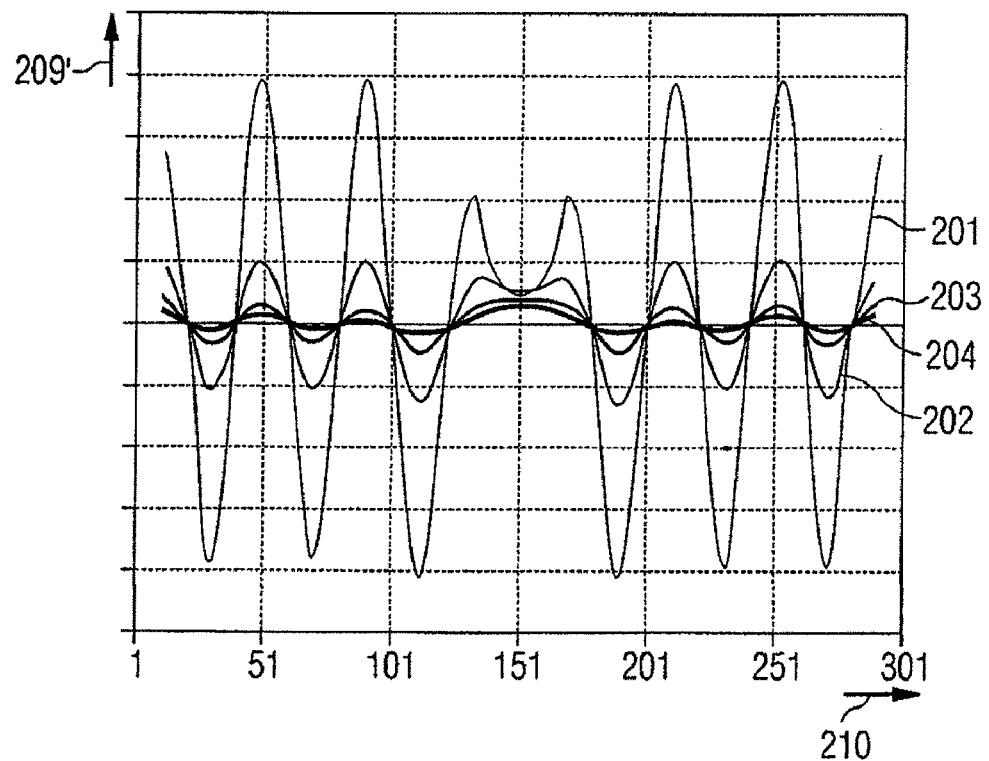
FIG. 6(b) shows the differential tangential magnetic flux profile as a function of the detection position, which profile results from the differential of the tangential magnetic flux 209 of FIG. 6(a)

It should be pointed out that the tangential magnetic flux profile 209 shown in FIG. 3 is represented as a function of the detection position 210 for a magnetic dipole whose field line profile 212a-212m of magnetic flux lines is illustrated two-dimensionally in FIG. 4. The magnetic field profile illustrated in FIG. 3 and in FIGS. 9 and 10 described below is produced by virtue of a transmitter unit 113 that comprises first transmitter elements 101 and second transmitter elements 102 (see the lower part of FIG. 9(a)) being led past a pick-up unit 105 (FIG. 1). In this case, for the profile shown in FIG. 3 for different air gaps 201, 202, 203 and 204, a center position 211 results at which the direction of the tangential magnetic flux 209 is reversed.

The provision of a reference detection region 213 in accordance with a preferred exemplary embodiment of the present invention is discussed below. According to the invention, a magnetic attenuation unit 104 is applied on the transmitter unit 113 above at least one of the first 101 and/or second transmitter elements 102. Said magnetic attenuation unit is preferably applied as a coating. In a preferred exemplary embodiment of the present invention, the layer thickness lies within a range of between 1 µm and 100 µm. The magnetic attenuation unit 104 influences the profile of the magnetic field or the profile of the magnetic flux which is generated by the first and second transmitter elements 101, 102 arranged alternately one behind another in a line.

Figure 8:
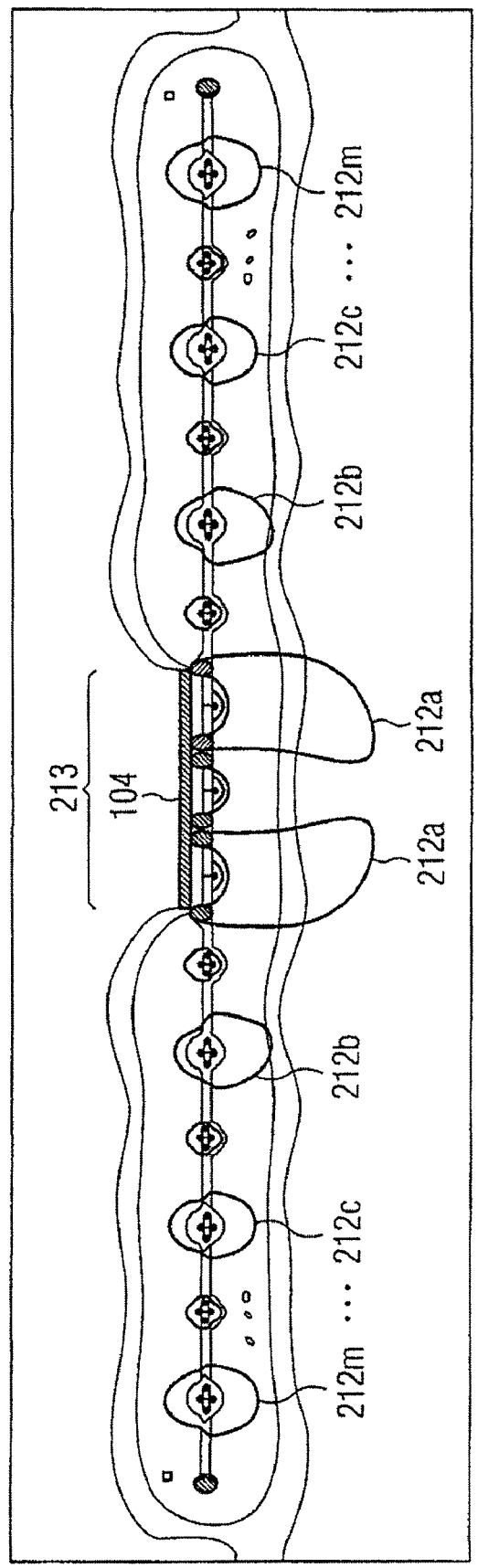
FIG. 8 shows a magnetic flux distribution of a transmitter unit having a magnetic attenuation unit, in accordance with a preferred exemplary embodiment of the present invention in a two-dimensional illustration.

As shown in FIG. 8, in a preferred exemplary embodiment of the present invention, three transmitter elements in a reference detection region 213 are shielded by the magnetic attenuation unit 104. FIG. 8 shows a simulated resulting field line profile, wherein individual magnetic flux lines 212a, 212b, 212c, . . . are illustrated by way of example in a two-dimensional illustration.

For reference position detection in the case of a rotor or a linear encoder, rather than making use of the introduction of an asymmetry in the alternating arrangement of the first and second transmitter elements 101, 102 as was conventionally done, now use is made of reducing the magnetic flux in a predetermined region along the first and second transmitter elements 101, 102 arranged alternately in a line with the aid of the magnetic attenuation unit 104. The effect of the magnetic attenuation unit 104 on the profile of the magnetic flux line 212a-212m is illustrated qualitatively in FIG. 8. The description below illustrates, with reference to FIGS. 9(a), 9(b), 10(a) and 10(b), the influence of the shielding of the magnetic flux by the magnetic attenuation unit 104 on the signal profile of the output signal 207.

FIGS. 9(a), 9(b), 10(a) and 10(b) illustrate different tangential magnetic flux profiles as a function of a detection position 210 wherein the detection positions 210 of the individual FIGS. 9(a), 9(b), 10(a) and 10(b) correspond to one another. As illustrated in FIG. 9(a) in the lower part of the figure, the magnetic attenuation unit 104 extends over a total of three transmitter elements 101, 102 and thus forms the reference detection region 213. It can firstly be discerned in FIG. 9(a) that the periodic profile is also not disturbed in the reference detection region 213 but rather only attenuated in terms of intensity. That is to say, the amplitudes of the corresponding sinusoidal tangential magnetic flux profiles do not vary to such a great extent in the reference detection region 213 as in the magnetic non-shielded regions to the left and right (or in the counterclockwise direction and in the clockwise direction) of the reference detection region 213.

FIGS. 9(a), 9(b), 10(a) and 10(b) in each case illustrate four curve profiles by way of example for four different air gap sizes. Thus, the respective curve profiles which are identified by the reference symbols 201 correspond to a first air gap, which, in the preferred exemplary embodiment of the present invention has a size of 1 mm, the reference symbols 202 designate a second air gap having a size of 2 mm, reference symbols 203 designate a third air gap having a size of 3 mm and the reference symbols 204 in all of FIGS. 9(a) to 10(b) designate a fourth air gap having a size of 4 mm. For the definition of the air gap also see FIG. 2.

FIG. 9(b) shows profiles of a differential tangential magnetic flux 209' for the same air gap widths 201-204 as shown with reference to FIG. 9(a). In this case, the curve profiles in FIG. 9(b) correspond to the differentials of the tangential magnetic flux profiles 209 shown in FIG. 9(a). Such a differentiation of the tangential magnetic flux profiles 209 is usually carried out in order to suppress disturbances, etc. which have fast temporal changes.

Figure 7A:
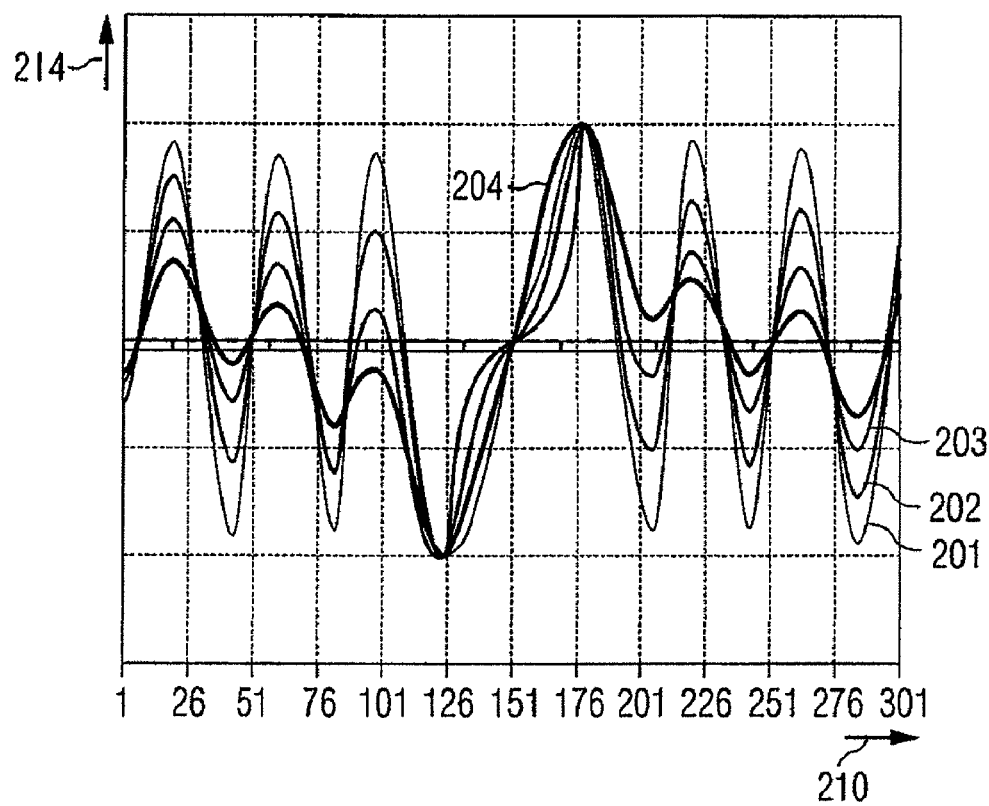
FIG. 7(a) shows a normalized tangential magnetic flux as a function of the detection position, which magnetic flux results from the normalization of the magnetic flux shown in FIG. 6(a)
Figure 7B:
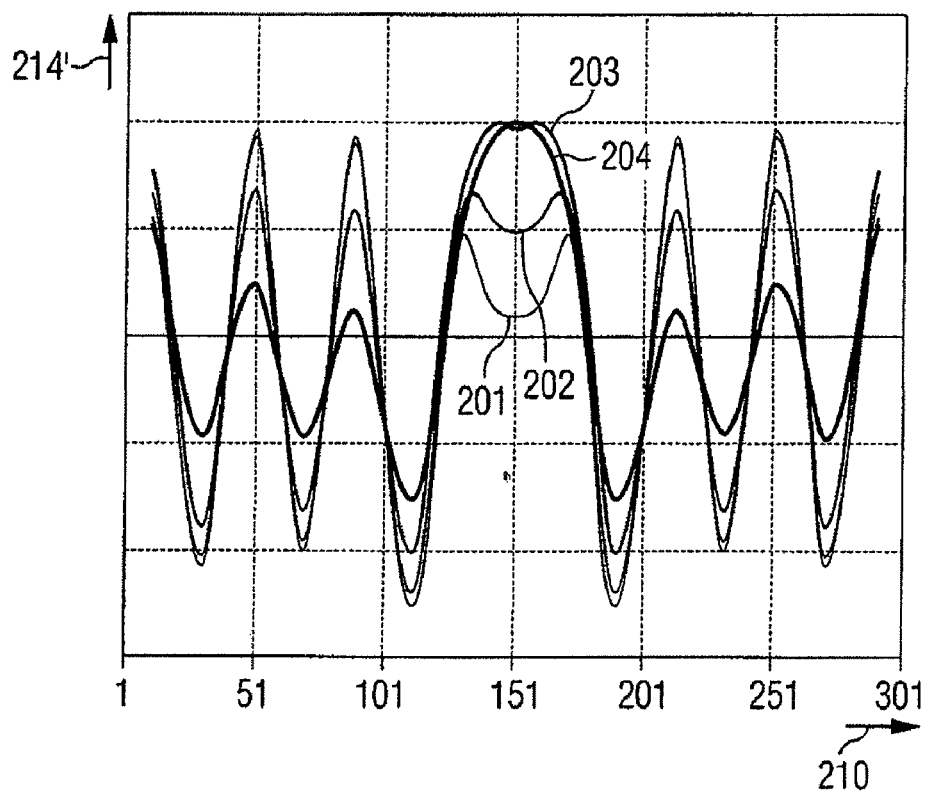
FIG. 7(b) shows a differential normalized tangential magnetic flux, which results from forming the differential of the normalized tangential magnetic flux shown in FIG. 7(a)

A normalization of the differential tangential magnetic fluxes 209' is performed in the further signal processing as shown with reference to FIG. 10(a). It should be pointed out here that signal processing methods for differentiating signal profiles are known to the person skilled in the art, and so a description thereof is omitted here. FIG. 10(b) shows the normalized tangential magnetic flux profiles 214 of FIG. 10(a) after a normalization. The differential normalized tangential magnetic flux profiles 214' thus obtained in FIG. 10(b) exhibit an unambiguous behavior in the reference detection region 213, in such a way that amplitude variations to the right and left of the reference detection region 213 are avoided. In comparison with the conventional signal profile which is shown in FIG. 7(b) and is produced by means of the conventional magnetic sensor device, the variations in the signal profiles to the right and left of the reference detection region 213 that are shown in FIG. 10(b) are significantly smaller.

In this way, a reliable reference position detection is made possible even upon the occurrence of manufacturing tolerances which affect the size of the air gap 201, 202, 203, 204, for example. Such an unambiguous reference position detection is made possible owing to the fact that the alternating arrangement of the first transmitter elements 101a-101n and the second transmitter elements 102a-102n in a line one behind another is not disturbed.

The reference position detection is made possible by merely placing a magnetic attenuation unit 104 over specific transmitter elements from among the first and/or second transmitter elements 101a-101n, 102a-102n. In a preferred exemplary embodiment of the present invention, the magnetic attenuation unit 104 is formed from a ferromagnetic material. It is advantageous to provide the magnetic attenuation unit 104 as a coating. In accordance with a further preferred exemplary embodiment of the present invention, the layer thickness can be provided within a range of between 1 μm and 100 μm.

The magnetic sensor device 100 of the present invention can comprise for example a transmitter unit 113 formed as a rotor. Furthermore, it is possible, for measuring a transverse movement, to arrange the alternating first and second transmitter elements 101, 102 in a straight line, in such a way that a magnetic ruler is provided. The first 101a-101n and second transmitter elements 102a-102n arranged alternately one behind another in a line have a predetermined pitch distance 206 (see FIG. 1), wherein the predetermined pitch distance 206 corresponds to a sum of widths of one of the first 101a-101n and one of the second transmitter elements 102a-102n in the direction of the relative movement 300 (see FIG. 2).

In a preferred exemplary embodiment of the present invention, the magnetic attenuation unit 104, by means of which the at least one of the alternating first and second transmitter elements 101a-101n, 102a-102n are shielded, extends over 1.5 times the pitch distance 206.

Although the present invention has been described above on the basis of preferred exemplary embodiments, it is not restricted thereto but rather can be modified in diverse ways.

The invention is not restricted to the application possibilities mentioned.

The invention claimed is:

1. A sensor device for detecting a relative movement, comprising:
   a transmitter unit configured to generate a field, the transmitter unit comprising:
      first transmitter elements; and
      second transmitter elements,
         wherein the first transmitter elements and the second transmitter elements, configured to generate a spatially varying field, are arranged alternately one behind another along a line at predetermined positions, and
         wherein at a reference position, which corresponds to at least one of the predetermined positions of a first or second transmitter element along the line, at least one value of the field is altered by a positive factor with respect to a corresponding other position of a first or second transmitter element;
   a pick-up unit configured to generate an alternating output signal depending on the field generated by the first and second transmitter elements,
      wherein the transmitter unit and the pick-up unit can be moved relative to one another; and
   an attenuation unit at the reference position configured to attenuate the field and formed as a coating.

2. The sensor device as claimed in claim 1, wherein the coating has a layer thickness within a range of 1 μm to 100 μm.

3. The sensor device as claimed in claim 1, wherein the first transmitter elements and the second transmitter elements are arranged alternately one behind another in a straight line, and the relative movement detected is a transverse movement.

4. The sensor device as claimed in claim 1, wherein the first transmitter elements and the second transmitter elements are arranged alternately one behind another on a circle circumference, and the relative movement detected is a rotational movement in a predetermined rotation direction.

5. The sensor device as claimed in claim 1, wherein the first and second transmitter elements arranged alternately one behind another in a line have a predetermined pitch distance.

6. The sensor device as claimed in claim 5, wherein the predetermined pitch distance corresponds to a sum of widths of one of the first and one of the second transmitter elements in the direction of the relative movement.

7. The sensor device as claimed in claim 5, wherein the attenuation unit extends over 1.5 times the pitch distance.

8. The sensor device as claimed in claim 1, wherein the field generated is a magnetic field.

9. The sensor device as claimed in claim 8, wherein the attenuation unit is formed from a ferromagnetic material.

10. The sensor device as claimed in claim 8, wherein the attenuation unit comprises a coating having a layer thickness within a range of 1 μm to 100 μm.

11. The sensor device as claimed in claim 8, wherein the transmitter unit is comprises a rotor.

12. A method for detecting a relative movement, comprising:
   a) generating a field by a transmitter unit comprising first transmitter elements and second transmitter elements arranged alternately one behind another along a line at predetermined positions, wherein the generating comprises:
      a1) generating a spatially varying field, by the first transmitter elements and the second transmitter elements; and
      a2) altering, at a reference position which corresponds to at least one of the predetermined positions of a first or second transmitter element along the line, at least one value of the field by a positive factor with respect to a corresponding other position of a first or second transmitter element, wherein altering the at least one value of the field comprises attenuating the field by an attenuation unit formed as a coating; and
   b) generating an alternating output signal depending on the field generated by the first and second transmitter elements, by a pick-up unit, wherein the transmitter unit and the pick-up unit are moved relative to one another.

13. The method as claimed in claim 12, further comprising detecting a transverse movement as the relative movement by means of the first transmitter elements and the second transmitter elements which are arranged alternately one behind another in a straight line.

14. The method as claimed in claim 12, further comprising detecting a rotational movement in a rotation direction as the relative movement by means of the first transmitter elements and the second transmitter elements which are arranged alternately one behind another on a circle circumference.

15. The method as claimed in claim 12, further comprising forming a differential normalized output signal.

16. The method as claimed in claim 12, further comprising forming an output signal depending on a tangential alteration of the field along the line.

17. A sensor device for detecting a relative movement, comprising:
   a transmitter means for generating a field comprising first and second transmitter element means for generating a spatially varying field, wherein the first and second transmitter element means are arranged alternately one behind another along a line at predetermined positions,
   wherein at a reference position, which corresponds to at least one of the predetermined positions of a first or second transmitter element means along the line, at least one value of the field is altered by a positive factor with respect to a corresponding other position of a first or second transmitter element means;
   a pick-up means for generating an alternating output signal depending on the field generated by the first and second transmitter element means,
   wherein the transmitter means and the pick-up means can be moved relative to one another; and
   an attenuation unit at the reference position configured to attenuate the field and formed as a coating.

* * * * *